US008799211B1

(12) United States Patent
Bezbaruah et al.

(10) Patent No.: US 8,799,211 B1
(45) Date of Patent: Aug. 5, 2014

(54) CASCADED REPLICATION SYSTEM WITH REMOTE SITE RESYNCHRONIZATION AFTER INTERMEDIATE SITE FAILURE

(75) Inventors: Angshuman Bezbaruah, Pune (IN); Anand A. Kekre, Pune (IN); Ankur P. Panchbudhe, Nagpur (IN)

(73) Assignee: Symantec Operating Corporation, Mountain View, CA (US)

( * ) Notice: Subject to any disclaimer, the term of this patent is extended or adjusted under 35 U.S.C. 154(b) by 1522 days.

(21) Appl. No.: 11/221,114

(22) Filed: Sep. 6, 2005

(51) Int. Cl.
*G06F 17/30* (2006.01)

(52) U.S. Cl.
USPC .......................................................... 707/610

(58) Field of Classification Search
CPC .......... G06F 17/30578; G06F 11/2064; G06F 11/2074
See application file for complete search history.

(56) References Cited

U.S. PATENT DOCUMENTS

| | | | | |
|---|---|---|---|---|
| 6,023,707 | A * | 2/2000 | Hamada et al. | 707/202 |
| 6,449,622 | B1 * | 9/2002 | LaRue et al. | 707/201 |
| 6,584,477 | B1 * | 6/2003 | Mosher, Jr. | 707/204 |
| 2002/0144068 | A1 * | 10/2002 | Ohran | 711/161 |
| 2003/0014432 | A1 | 1/2003 | Teloh et al. | 707/204 |
| 2003/0014433 | A1 * | 1/2003 | Teloh et al. | 707/204 |
| 2005/0177603 | A1 | 8/2005 | Shavit | 707/204 |
| 2006/0056421 | A1 * | 3/2006 | Zaki | 370/400 |
| 2006/0218210 | A1 * | 9/2006 | Sarma et al. | 707/204 |

OTHER PUBLICATIONS

Bertrand, Christophe, et al., *Business Continuity and the Hitachi TagmaStore™ Universal Storage Platform*, A White Paper, Enterprise Storage, Hitachi Data Systems, Sep. 2004, pp. 1-18.

* cited by examiner

*Primary Examiner* — Christyann R. Pulliam
*Assistant Examiner* — Dinku Gebresenbet
(74) *Attorney, Agent, or Firm* — Campbell Stephenson LLP

(57) ABSTRACT

Various methods and systems for performing cascaded replication are disclosed. For example, one method involves receiving an acknowledgment at a primary replication site from an intermediate replication site. The acknowledgment identifies whether a change has been applied to a remote replication site. The method also involves updating a journal, in response to the acknowledgment. The journal identifies whether the change is currently being replicated. The method can also involve detecting that the intermediate replication site is inaccessible. In response, the method synchronizes a copy of application data at the remote replication site by applying one or more changes identified in the journal to the copy of the application data at the remote replication site.

18 Claims, 6 Drawing Sheets

CASCADED REPLICATION SYSTEM WITH REMOTE SITE RESYNCHRONIZATION AFTER INTERMEDIATE SITE FAILURE

FIELD OF THE INVENTION

This invention relates to data storage systems and, more particularly, to performing replication within a data storage system.

BACKGROUND

Replication is one technique utilized to minimize data loss and improve the availability of data. During replication, a copy of the same data is stored at each of several sites or nodes. If the working copy (the copy currently being used by an application) of that data is lost, one of the replicated copies can be used.

Performance metrics used to assess replication systems include recovery point objective (RPO) and recovery time objective (RTO). The RPO metric is used to indicate the point in time to which data (e.g., application data, system state, and the like) must be recovered by a replication system. In other words, RPO indicates how much data loss (e.g., 2 hours worth of data loss) can be tolerated by applications associated with the replication system. The RTO metric is used to indicate the time within which systems, applications, and/or operations associated with the replication system must be recovered.

Optimally, a replication system would provide for instantaneous (zero RTO) and complete (zero RPO) recovery of data from one or more remote sites at a great distance from the data-generating primary node. However, implementation of such a replication system using conventional techniques would be extremely inefficient, in terms of both write operation latency and cost. In particular, the cost of the high-speed link(s) required by such replication systems has discouraged their implementation however in all but a small number of application environments.

Replication systems in which high-frequency data replication is performed over short, high-speed links, as well as systems in which low-frequency data replication is performed over longer, low-speed links, similarly suffer from a number of drawbacks (e.g., a poor RPO metric, high write operation/application latency, high cost, and the like). Consequently, a number of replication systems have been implemented in which such short-distance, high-speed/frequency replication (e.g., real-time or synchronous replication) is coupled (e.g., cascaded) with long-distance, low-speed/frequency replication. In a cascaded replication system, copies of all the data generated and/or stored at the primary node are maintained at both an intermediate node (e.g., via short-distance, high-speed/frequency replication between the primary and intermediary nodes) and a remote node (e.g., via long-distance, low-speed/frequency replication between the intermediate and remote nodes).

In a cascaded replication system, updates to data stored at the primary node are typically replicated synchronously to the intermediate node from the primary node. The updates are then replicated asynchronously from the intermediate node to the remote node. Because the asynchronous replication is controlled by the intermediate node, the primary node has no information indicating the state of data stored at the remote node, relative to data stored at the primary node. If the intermediate node fails, the primary node will not be able to determine how far behind the data at the remote node is, relative to the data at the primary node, and thus the primary node will be unable to continue ongoing replication to the remote node. Instead, the primary node will have to reinitialize the data at the remote node to a known state and then restart replication. As this example shows, improved techniques for dealing with intermediate node failures are desirable.

SUMMARY

Various embodiments of methods and systems for performing cascaded replication are disclosed. For example, one method involves receiving an acknowledgment at a primary replication site from an intermediate replication site. The acknowledgment identifies whether a change has been applied to a remote replication site. The method also involves updating a journal, in response to the acknowledgment. The journal identifies whether the change is currently being replicated.

In some embodiments, updating the journal involves updating a pointer. The pointer points to a position within the journal. The acknowledgment includes information identifying a location of a second pointer, which points to a position within a second journal located at the intermediate replication site. After the journal is updated, the pointer to the journal points to an entry that corresponds to the entry identified in the second journal by the second pointer. Alternatively, in some embodiments that perform periodic replication between the intermediate and remote sites, updating the journal can involve inserting a marker into an entry in the journal. In these embodiments, the acknowledgement identifies that modifications that occurred during a prior replication period have been applied to the remote site.

The method can also involve detecting that the intermediate replication site is inaccessible. In response, the method synchronizes a copy of application data at the remote replication site by applying one or more changes identified in the journal to the copy of the application data at the remote replication site.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
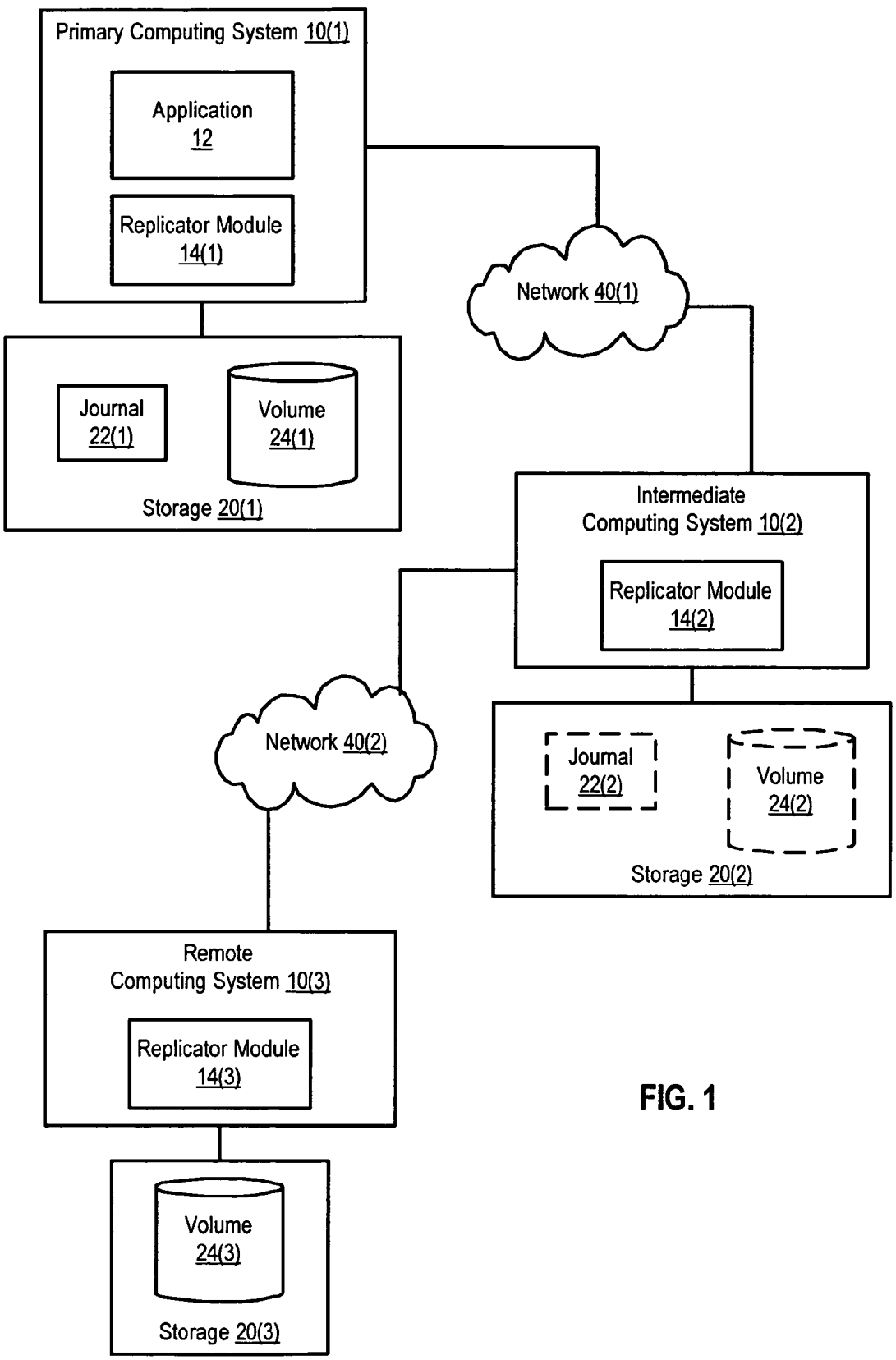
FIG. 1 is a block diagram of a system for performing cascaded replication, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a system for performing cascaded replication. This system includes a primary computing system 10(1), an intermediate computing system 10(2), and a remote computing system 10(3). Primary computing system 10(1) is coupled to intermediate computing system 10(2) by a network 40(1). Intermediate computing system 10(2) is coupled to remote computing system 10(3) by a network 40(2). Networks 40(1) and 40(2) can each include a WAN (Wide Area Network), such as the Internet, one or more LANs (Local Area Networks), and/or one or more SANs (Storage Area Networks).

Primary computing system 10(1) implements the functionality of an application 12 and a replicator module 14(1). Intermediate computing system 10(2) implements a replicator module 14(2). Remote computing system 10(3) implements replicator module 14(3).

While FIG. 1 shows a situation in which each replicator module 14(1)-14(3) is implemented in software that executes on a computing system, it is noted that replicator modules 14(1)-14(3) can alternatively be implemented in hardware and/or software on a host, network switch, network appliance, or storage device controller (e.g., an array controller). Additionally, in one embodiment, replicator modules 14(1), 14(2), and 14(3) are implemented using VERITAS Volume Replicator™, available from VERITAS Software Corp., of Mountain View, Calif.

Primary computing system 10(1) is coupled to storage 20(1). Similarly, intermediate computing system 10(2) is coupled to storage 20(2), and remote computing system 10(3) is coupled to storage 20(3). Primary computing system 10(1) and storage 20(1) are collectively referred to as the "primary site." Similarly, intermediate computing system 10(2) and storage 20(2) are collectively referred to as the "intermediate site," and remote computing system 10(3) and storage 20(3) are collectively referred to as the "remote site."

In some embodiments, the intermediate site is implemented at a location that is closer to the primary site than the remote site. For example, the intermediate site can be located a few miles (e.g., less than 10) away from the primary site, while the remote site is located many miles (e.g., several hundred or more) away from the primary site. In such situations, the intermediate site can be coupled to the primary site by a higher-speed link than is used to couple the intermediate site to the remote site. Additionally (or alternatively), the type of replication (e.g., synchronous replication) performed between the primary site and the intermediate site can be performed at a higher frequency than the type of replication (e.g., asynchronous or periodic) performed between the intermediate site and remote site.

Each computing system 10(1)-10(3) at each site can include one or more computing devices configured to execute software implementing various applications (e.g., application 12 and/or one of replicator modules 14(1)-14(3)). In such embodiments, each computing system 10(1)-10(3) can include a workstation, personal computer, server, PDA (Personal Digital Assistant), cell phone, storage network switch, storage device, storage array controller, or any other device configured to execute software implementing such applications. Alternatively, each computing system 10(1)-10(3) can be implemented from one or more logic devices (e.g., PLDs, FPGAs, and the like) configured to perform the functions of such applications. Computing systems 10(1)-10(3) can also be implemented using logic devices that are configured to perform some of the functions of the applications and that are also configured to execute software implementing other functions of the applications.

Application 12 is an example of an application that accesses application data in volume 24(1). Application 12 can be any one of a variety of applications, such as a database application, a word processing application, and the like. It is noted that in some embodiments, application 12 is distributed in nature (e.g., like Oracle Parallel Server™ or Oracle RAC™, available from Oracle Corporation of Redwood Shores, Calif.). Such applications can access the same data (or files) from different computing systems (e.g., there can be multiple primary computing systems, each implementing an instance of the distributed application, at the primary site).

Storage 20(1), 20(2), and 20(3) each include one or more storage devices (e.g., disk drives, arrays of disk drives, Compact Discs (CDs), Digital Versatile Discs (DVDs), and the like). Storage 20(1) implements volume 24(1) and also stores information included in a journal 22(1). Storage 20(2) stores information in journal 22(2) and/or implements volume 24(2) (volume 24(2) and journal 22(2) are each optional in some embodiments, as indicated by the dashed lines). Storage 20(3) implements volume 24(3). Volumes 24(1), 24(2), and 24(3) can be logical or physical storage devices.

Replicator module 14(1) replicates the information stored in volume 24(1) to intermediate computing system 10(2). In turn, replicator module 14(2) replicates that information to remote computing system 10(3). The replicated information is stored in volume 24(3) at the remote site.

Volume 24(3) is a consistent copy of volume 24(1). Consistency ensures that, even if the information in volume 24(3) is not identical to the information in volume 24(1) (e.g., updates to volume 24(3) may lag behind updates to volume 24(1)), volume 24(3) always represents a state of volume 24(1) that actually existed (or could have existed without violating any write-ordering rules) at a previous point in time. For example, if an application performs a sequence of writes A, B, and C to volume 24(1), consistency can be maintained by replicating those writes to volume 24(3) in the same sequence. At no point should volume 24(3) reflect a state that could not have actually occurred on volume 24(1), such as the state that would have occurred if write C was performed before write B.

Thus, replicator modules 14(1)-14(3) interact with each other to maintain a replica (a consistent copy) of information stored in volume 24(1) on volume 24(3). In some embodiments, a consistent copy of volume 24(1) is also maintained at the intermediate site (e.g., in optional volume 24(2)). By maintaining consistent copy of the information in volume 24(1) at the remote and/or intermediate sites, application 12 can be restarted at another site, using the replicated information, if the application data at the primary site becomes inaccessible (e.g., due to a storage device failure, maintenance, network failure, or the like).

Replicator modules 14(1)-14(3) can each participate in replication using a variety of techniques (e.g., synchronous replication, asychronous replication, periodic replication, or the like). In one embodiment, replicator module 14(1) uses synchronous replication to replicate information to from volume 24(1) to the intermediate site, and replicator module 14(2) uses periodic or asynchronous replication to replicate that information to the remote site. In some embodiments, if replicator module 14(2) is using periodic replication, based on snapshots, to replicate information to the remote site, then both the intermediate site and the remote site will store a snapshot that identifies the changes that occurred during a particular period. These snapshots are a type of journal, since the snapshots store information identifying changes that have occurred during a particular period.

During normal operation, replicator modules 14(1), 14(2), and 14(3) interact with each other (e.g., by sending requests and/or data to each other via networks 40(1) and 40(2) and by respectively controlling activity that affects volumes 24(1), 24(2), and/or 24(3) as well as journals 22(1) and 22(2)) in order to maintain volumes 24(2) and/or 24(3) as a replica of volume 24(1). This involves detecting operations that modify values stored in volume 24(1), and sending information identifying those operations across network 40(1) so that the operations can be applied to journal 22(2) and/or secondary volume 24(2), if present. Thus, during replication, incremental changes that occur to primary volume 24(1) (e.g., due to applications such as application 12 modifying, creating, and/or deleting information in volume 24(1)) are replicated to the intermediate site.

Replicator module 14(1) also stores modifications that occur to volume 24(1) in journal 22(1). Replicator module 14(1) can store these modifications in journal 22(1) synchronously, as the modifications are applied to primary volume 24(1). For example, each time application 12 writes to volume 24(1), the new data being written is stored in both volume 24(1) and journal 22(1). Journal 22(1) can be implemented as a queue or other suitable data structure. As noted above, in some embodiments, journals are implemented as snapshots, which are point-in-time copies of at least a portion of the information stored in a particular volume or set of volumes. Replicator module 14(1) can use the information stored in journal 22(1) to synchronize the information in volume 24(3) with volume 24(1), if the intermediate site becomes inaccessible.

Replicator module 14(2) stores the modifications that are received from the primary site to storage 20(2). These modifications can be stored in journal 22(2) and/or applied to volume 24(2). Replicator module 14(2) subsequently replicates the modifications to the remote site. For example, if replicator module 14(2) is performing asynchronous replication, replicator module 14(2) can store modifications received from the primary site in journal 22(2). Replicator module 14(2) can then replicate the modifications from journal 22(2) to the remote site. As another example, if replicator module 14(2) is performing periodic replication, replicator module 14(2) can apply modifications received from the primary site to volume 24(2). At the start of each replication period, replicator module 14(2) can replicate the modifications that were applied to volume 24(2) in the previous replication period.

Alternatively, periodic replication can be performed using snapshots of volumes 24(2) and 24(3). For example, volume 24(2) can be maintained as a copy of volume 24(1), using synchronous replication. Each period, replicator module 14(2) creates a point-in-time copy, or snapshot, of volume 24(2). Replicator module 14(2) then extracts the changes between successive snapshots of volume 24(2) and transfers the extracted changes to the remote site, where the changes are applied to volume 24(3). For example, the changes can be applied to a snapshot of volume 24(3) at the remote site, and then volume 24(3) can be restored from that snapshot. As an example, at time $T_N$, replicator module 14(2) creates a snapshot of volume 24(2). Between times $T_N$ and $T_{N+1}$, replicator module 14(2) extracts the changes that occurred between the snapshots taken at times $T_N$ and $T_{N-1}$ and sends these changes to the remote site.

Whenever replicator module 14(2) determines that a set of one or more modifications have been applied at the remote site, replicator module 14(2) generates an acknowledgment. Replicator module 14(2) sends the acknowledgment to replicator module 14(1). Replicator module 14(2) can detect that one or more modifications have been applied at the remote site in a variety of different ways. For example, if replicator module 14(2) is performing asynchronous replication, replicator module 14(2) can determine that a modification has been applied to volume 24(3) at the remote site in response to receiving an acknowledgment of that modification from the remote site. If replicator module 14(2) is performing periodic replication, replicator module 14(2) can determine that a set of modifications have been applied at the remote site in response to either receiving acknowledgments from the remote site or detecting that a new replication period has begun.

The acknowledgment identifies which outstanding modifications (i.e., modifications that have occurred to volume 24(1) but that have not yet been confirmed as having been applied to volume 24(3) at the remote site) have been applied to the remote site. The acknowledgment can identify the modifications that have been applied to the remote site by explicitly identifying the modifications, or by sending information (e.g., pointer values, replication period markers, and the like) that indirectly identifies the modifications.

For example, in embodiments in which replicator module 14(2) maintains journal 22(2), replicator module 14(2) can update a pointer to journal 22(2) whenever an acknowledgment is received from the remote site. For example, if journal 22(2) includes an entry of journal 22(2) identifying a new value of block A, replicator module 14(2) can advance the pointer beyond this entry when the remote site acknowledges that the new value of block A has been applied to volume 24(3). Advancing the pointer beyond this entry identifies that the modification represented by that entry is no longer outstanding (accordingly, the entry can be reused, e.g., if journal 22(2) is a circular queue). Replicator module 14(2) can then include the updated pointer position in the acknowledgment that is sent to replicator module 14(1).

Whenever replicator module 14(1) receives an acknowledgment from replicator module 14(2), replicator module 14(1) updates journal 22(1). As noted above, the acknowledgment identifies which modifications have been applied to the remote site. Accordingly, replicator module 14(1) can update journal 22(1) so that those modifications are no longer identified as being outstanding within journal 22(1). For example, if the acknowledgment identifies that the new value of block B has been applied to the remote site, replicator module 14(1) can remove an entry corresponding to that modification from journal 22(1) (e.g., by invalidating or deleting that entry or by advancing a pointer beyond that entry). As a result of updating journal 22(1) in response to the acknowledgments, journal 22(1) can be used to identify modifications that have been applied to volume 24(1) but that are not yet confirmed as having been applied to volume 24(3).

As another example, in some embodiments replicator module 14(2) uses snapshot-based periodic replication (as described above) to send modifications to the remote site. In such an embodiment, whenever replicator module 14(2) creates a new snapshot of volume 24(2), replicator module 14(2) sends a message to replicator module 14(1) (this message can be sent at substantially the time as or subsequent to creation of the new snapshot). The message indicates that a new snapshot has been created at the intermediate site. In response to receiving this message, replicator module 14(1) at the primary site inserts an entry into journal 22(1). This entry indicates that a new snapshot has been created (e.g., "Snapshot created at $T_N$"). When replicator module 14(2) determines that the modifications have been applied to the remote site, replicator module 14(2) sends a second message, which acts as an acknowledgment, to the primary site. This message indicates that all modifications that occurred prior to the time at which the most recent snapshot was created have been applied to the remote site. In response to this acknowledgment, replicator module 14(1) can insert another entry into journal 22(1). This entry indicates that all modifications that occurred prior to the creation time of the most recent snapshot have been applied to the remote site (e.g., "Remote site synchronized up to $T_N$"). In an alternative embodiment, replicator module 14(2) can send acknowledgments by simply sending messages each time a new replication begins (e.g., each time a snapshot is created in snapshot-based periodic replication). Whenever replicator module 14(1) receives a new message (e.g., indicating that a snapshot is created at $T_{N+1}$), replicator module 14(1) determines that all of the modifications that occurred up to the time at which the most recent snapshot (created at $T_N$) have been applied to the remote site.

If the intermediate site becomes inaccessible, replicator module 14(1) can use journal 22(1) to synchronize the remote replica, stored in volume 24(3), with volume 24(1). In particular, replicator module 14(1) can synchronize the replica with volume 24(1) by sending all of the outstanding modifications, as identified in journal 22(1), to the remote site. For example, replicator module 14(1) can maintain two pointers (identifying the head and the tail of journal 22(1)) to journal 22(1). The journal entries in between these pointers correspond to outstanding modifications (one pointer can be updated as new entries are added to the journal in response to modifications to volume 24(1), while the other pointer can be updated as entries are removed from the journal in response to acknowledgments from the intermediate site). Once these modifications have been applied to the remote site, thus synchronizing volume 24(3), replicator module 14(1) can then begin replicating modifications directly between the primary and remote sites (without relying on the intermediate site to replicate the modifications to the remote site). In some embodiments, replicator module 14(1) detects that the modifications have been applied to the remote site based on acknowledgments received from the remote site.

While FIG. 1 illustrates a situation in which there is a single production system that accesses data in volume 24(1), it is noted that in alternative embodiments, multiple such production systems can be present. For example, a distributed file system (such as the cluster file system (CFS) provided by VERITAS Storage Foundation™, available from VERITAS Software Corp., of Mountain View, Calif.) can be executed on each of several different nodes within a cluster, allowing each node to act as a production system. Similarly, although a logical storage volume is shown in the illustrated example, other embodiments can use similar techniques to replicate data objects (such as files) that are stored directly on a physical storage device.

FIG. 1 illustrates a system configured to replicate files on a single data volume; however, other embodiments support replication of files from multiple data volumes. In such embodiments, the group of data volumes at the primary site can be included in a primary replication volume group. Files on this primary replication volume group are then replicated to one or more volumes at the intermediate and/or remote sites.

Figure 2A:
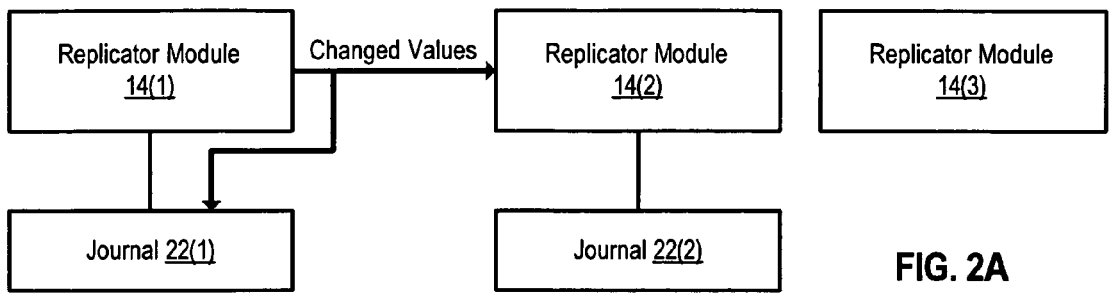
FIG. 2A illustrates how modifications are replicated to an intermediate site, according to one embodiment of the present invention.
Figure 2B:
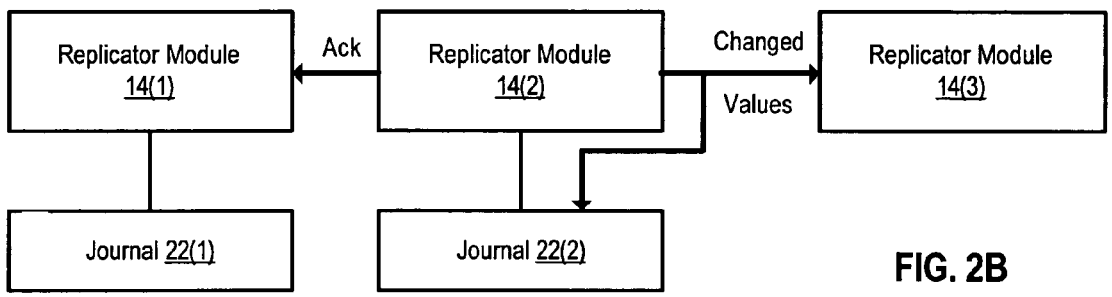
FIG. 2B illustrates how modifications are replicated to a remote site, according to one embodiment of the present invention.
Figure 2C:
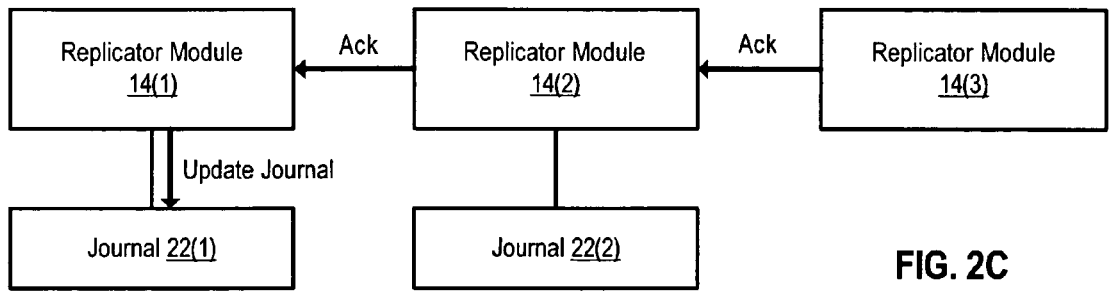
FIG. 2C illustrates how acknowledgements are propagated from the remote site to the primary site, according to one embodiment of the present invention.

FIGS. 2A, 2B, and 2C show replicator modules 14(1), 14(2), and 14(3) as well as journals 22(1) and 22(2) of FIG. 1. FIG. 2A illustrates an example of how modifications are replicated to an intermediate site. As shown, replicator module 14(1) sends changed values to replicator module 14(2). Replicator module 14(1) also stores information identifying these changed values in journal 22(1).

In one embodiment, replicator module 14(1) both applies the changes to journal 22(1) and replicates the changes to the intermediate site (where, replicator module 14(2) is located) synchronously. In other words, an operation that causes a value to change will not complete until the changed value has both been stored in journal 22(1) and replicated to the intermediate site.

FIG. 2B illustrates how the modifications shown in FIG. 2A are replicated to the remote site. As shown, replicator module 14(2) sends an acknowledgment (abbreviated "Ack" in FIG. 2B) of the changed values (sent to replicator module 14(2) in FIG. 2A) to the primary site. This acknowledgment indicates that the changed values have been applied to the intermediate site (e.g., either by storing the changed values in a journal or by applying the changed values to a replica). In response to receiving this acknowledgment, replicator module 14(1) can allow the operation that caused the changed values to complete.

Replicator module 14(2) stores the changed values received from the primary site (e.g., by storing the changed values in journal 22(2), as shown in FIG. 2B, or by applying the changed values to a local replica). Replicator module 14(2) also sends the changed values to replicator module 14(3) at the remote site.

FIG. 2C illustrates how acknowledgements are propagated from the remote site to the primary site. As shown, replicator module 14(3) sends an acknowledgment, indicating that the changed values have been applied to a replica at the remote site, to the intermediate site. If the replicator module 14(2) maintains a journal 22(2), as shown in FIG. 2C, replicator module 14(2) can update journal 22(2) in response to receiving the acknowledgment from the remote site. For example, replicator module 14(2) can update the journal by advancing a pointer to journal 22(2), so that the pointer advances past a journal entry that corresponds to the acknowledged changed value(s).

Replicator module 14(2) also sends an acknowledgment to the primary site. In some embodiments, this acknowledgment corresponds directly to the acknowledgment received from the remote site (e.g., for every acknowledgment that the intermediate site receives from the remote site, the intermediate site sends a corresponding acknowledgment to the primary site). However, in other embodiments, the information included in the acknowledgment sent to the primary site corresponds to several acknowledgments received from the remote site. For example, if replicator module 14(2) is using periodic replication to replicate changed values to the remote site, replicator module 14(2) can send an acknowledgment to the primary site at the beginning of each replication period (it is noted that the beginning of one replication period is also the end of the prior replication period). This acknowledgment may correspond to multiple acknowledgments received by the intermediate site from the remote site. Alternatively, replicator module 14(2) can send the acknowledgment to the primary site in response to detecting that all of the modifications that occurred in the previous replication period have now been applied to the remote site.

In response to the acknowledgment from the intermediate site, replicator module 14(1) updates journal 22(1). In one embodiment, the acknowledgment indicates that a new replication period has started. In such an embodiment, replicator module 14(1) can identify that all modifications that were replicated from the intermediate site to the remote site in the previous replication period are no longer outstanding. Thus, replicator module 14(1) can update journal 22(1) by removing entries corresponding to those modifications. For example, each time that an acknowledgment is received from the intermediate site, replicator module 14(1) can add a new entry to the journal. This entry can store a marker identifying the start of a new replication period or a marker identifying a particular prior snapshot creation time (e.g., such a marker can identify that all modifications that occurred prior to snapshot creation time $T_N$ have been applied to the remote site"). Replicator module 14(1) can also remove all of the entries in the journal that are older than the oldest marker (these entries correspond to the modifications that were replicated from the intermediate site to the remote site in the replication period that just ended).

In other embodiments (e.g., in embodiments where replicator module 14(2) performs asynchronous replication), each acknowledgment sent from the intermediate site to the primary site includes information identifying the position of one or more pointers to journal 22(2) at the intermediate site. In response to receiving such an acknowledgment, replicator module 14(1) can update one or more of its pointers to journal 22(1), such that at least one of its pointers points to an entry within journal 22(1) that corresponds to the entry within journal 22(2) that is identified by the one of the pointers at the intermediate site. For example, if replicator module 14(2) has advanced a pointer past an entry corresponding to a particular modification in journal 22(2), replicator module 14(1) can advance its corresponding pointer past the entry corresponding to that particular modification in journal 22(1). In this manner, one or more of the pointers to journal 22(1) will move in lockstep with corresponding pointer(s) to journal 22(2).

Figure 3A:
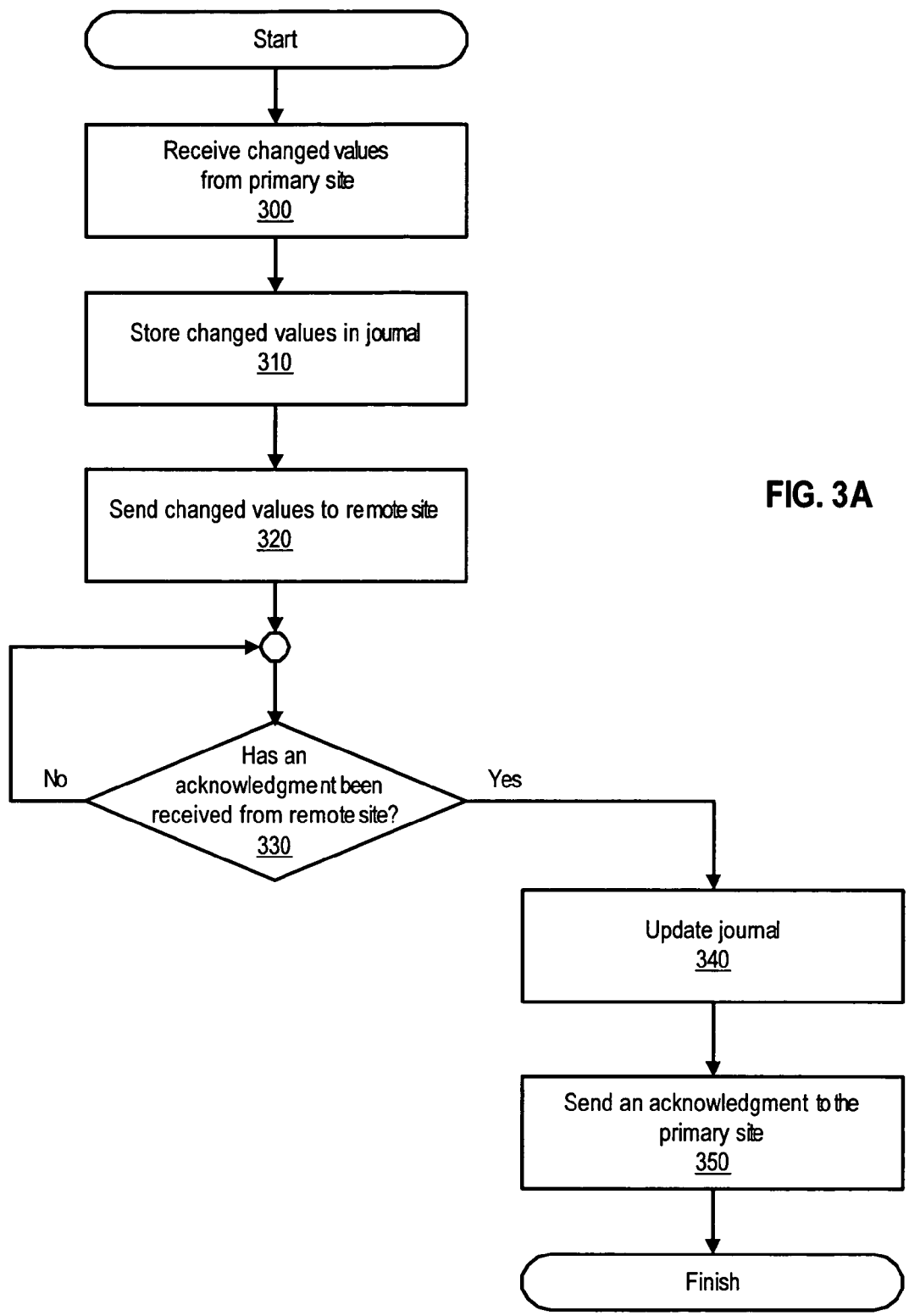
FIG. 3A is a flowchart of a method of operating an intermediate site in a cascaded replication system, according to one embodiment of the present invention.

FIG. 3A is a flowchart of a method of operating an intermediate site in a cascaded replication system. This method can be performed by a replicator module located at an intermediate site within the cascaded replication system. In this example, the replicator module at the intermediate site performs asynchronous replication to the remote site. The replicator module at the intermediate site also maintains a journal to keep track of modifications that have not yet been applied to the remote site. This journal identifies modifications that have not yet been sent to the remote site as well as modifications that have been sent to but have not yet been acknowledged by the remote site.

The method begins at 300, when the intermediate site receives changed values from the primary site. In response to receiving these changed values, the intermediate site stores the changed values in the journal, as indicated at 310. The intermediate site can store the changed values by adding entries corresponding to the changed values to the journal.

The intermediate site also sends the changed values to the remote site, as indicated at 320. After the remote site acknowledges that the changed values have been applied to the replica at the remote site, the intermediate site updates its journal, as indicated at 330 and 340. The intermediate site updates the journal to indicate that the changed values have been applied to the remote site (e.g., by advancing a pointer in order to remove entries corresponding to those changed values from the journal). It is noted that the granularity of journal entries may not correspond to the granularity of the acknowledgments (e.g., receipt of one acknowledgment can lead to the removal of more than one entry in the journal, in some embodiments).

The intermediate site also sends an acknowledgment to the primary site, as indicated at 350. This acknowledgment identifies changed values that have been applied to the remote site. For example, after advancing a pointer to the journal at the intermediate site, the intermediate site can generate an acknowledgment that includes the new value of the pointer.

Figure 3B:
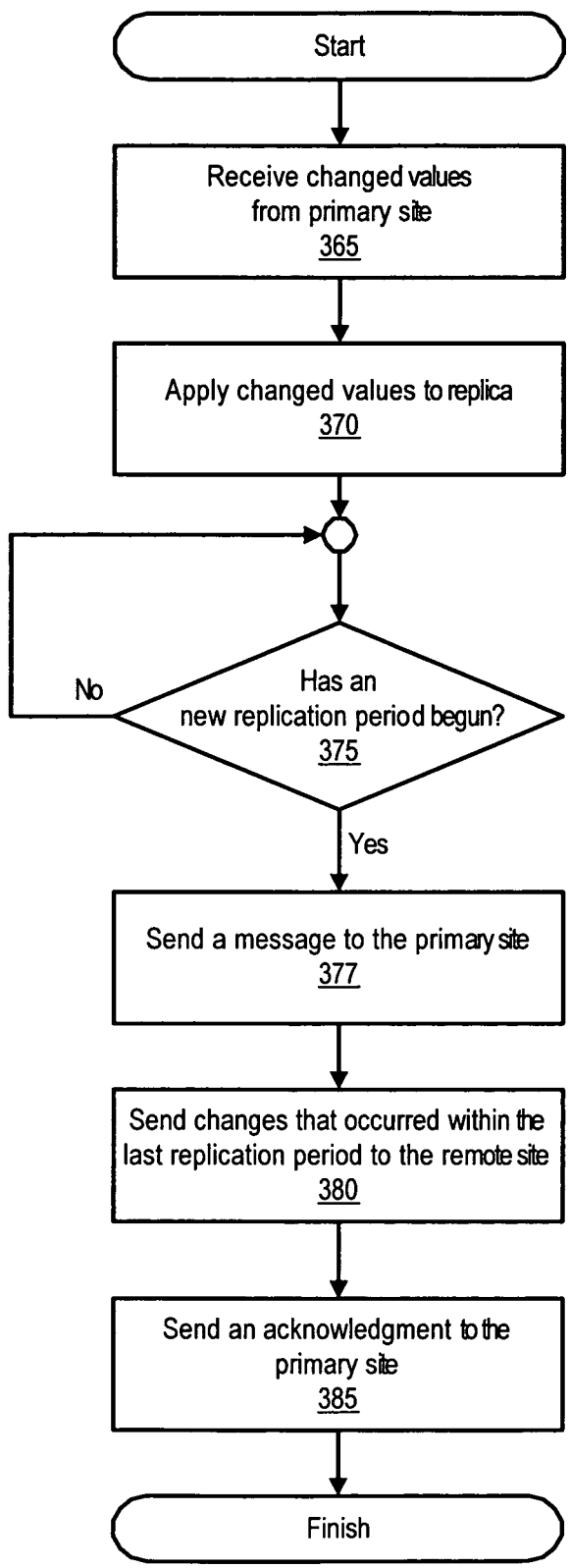
FIG. 3B is a flowchart of another method of operating an intermediate site in a cascaded replication system, according to one embodiment of the present invention.

FIG. 3B is a flowchart of another method of operating an intermediate site in a cascaded replication system. Like the method of FIG. 3A, this method can be performed by a replicator module located at an intermediate site within the cascaded replication system. In this example, the replicator module at the intermediate site performs periodic replication to the remote site. The replicator module at the intermediate site also maintains a replica of the application data that is being replicated from the primary site.

The method begins at 365, when the intermediate node receives one or more changed values from the primary site. These changed values are applied to a replica at the intermediate site, as shown at 370.

Periodic replication is used to replicate the replica at the intermediate site to a replica at a remote site. During each replication period, the changes that occurred at the intermediate site in the previous replication period are transferred to the remote site. Thus, when a new replication period begins (it is noted that the beginning of one replication period can occur simultaneously with the end of the previous replication period), as detected at 375, the intermediate site sends the changes that occurred within the last replication period to the remote site, as shown at 380. When a new replication period begins, the intermediate site can also send a message, which indicates the start of a new replication period, to the primary site, as shown at 377 (this operation is optional in some embodiments).

The intermediate site also sends an acknowledgment to the primary site, as shown at 385 (it is noted that operation 385 can be performed before, after, or at substantially the same time as operation 380, depending on the embodiment). This acknowledgment indicates which modifications have been applied to the remote site. In particular, the acknowledgment identifies that modifications that occurred during a prior replication period have been applied to the remote site. For example, in one embodiment, once all of the changes that were sent to the remote site at 380 have been acknowledged by the remote site, the intermediate site performs operation 385. In this example, the acknowledgment identifies that all changes up until the start of the new replication period (as signaled to the primary site by the message sent at 377) have been applied to the remote site. In other embodiments, functions 377 and 385 are combined. For example, in one such embodiment, if the new replication period begins at $T_{N+1}$, the prior replication period began at $T_N$, and the replication period before that began at $T_{N-1}$, the acknowledgment sent at $T_{N+1}$ indicates that modifications that occurred during the replication period that began at $T_{N-1}$ have been applied to the remote site.

Figure 4:
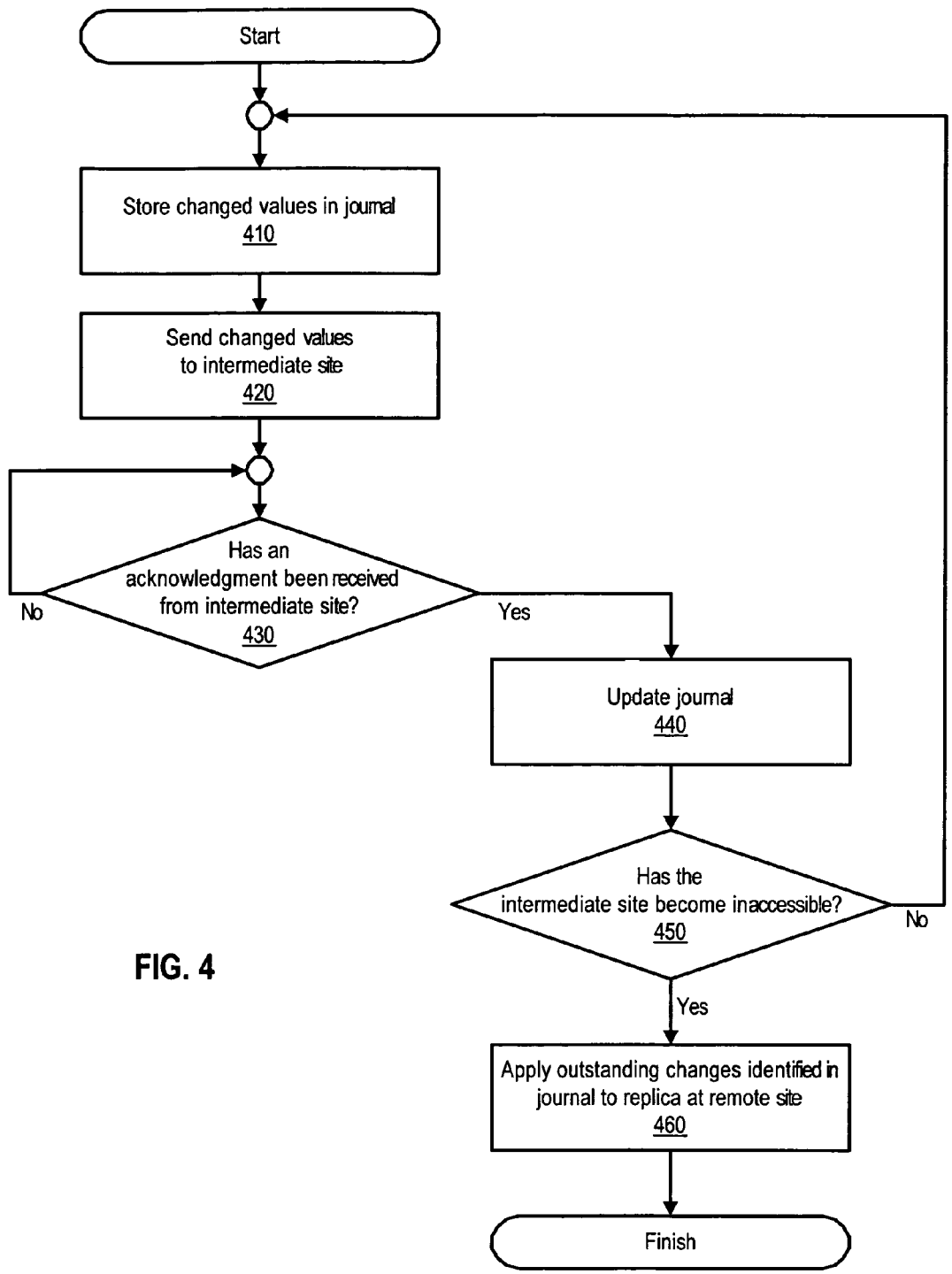
FIG. 4 is a flowchart of a method of operating a primary site in a cascaded replication system, according to one embodiment of the present invention.

FIG. 4 is a flowchart of a method of operating a primary site in a cascaded replication system. This method can be performed by a replicator module located at the primary site within the cascaded replication system.

The method begins at 410, when the primary site stores the changed values in a journal. The primary site also sends one or more changed values to the intermediate site, as shown at 420. It is noted that operation 410 can be performed before or at substantially the same time as operation 420.

If an acknowledgment that corresponds to activity at the remote site has been received from the intermediate site, as determined at 430, the primary site updates the journal, as indicated at 440. The primary site updates the journal so that the journal identifies which changed values have been applied to the primary site but have not yet been applied to the remote site. The primary site can update the journal in a variety of different ways. For example, if the acknowledgment received from the intermediate site includes a pointer value, the primary site can update a pointer to the journal based on that pointer value (e.g., the primary site can set its pointer equal to the pointer value provided in the acknowledgment). This can remove certain entries (corresponding to modifications that are no longer outstanding with respect to the remote site) from the journal, or simply update the journal to indicate that the modifications represented by those entries no longer correspond to outstanding modifications.

As an alternative, the primary site can update the journal by adding a marker to the journal. For example, if the acknowledgment simply indicates that a new replication period has begun (indicating that modifications that occurred in a prior replication period have been applied to the remote site), the primary site can add an entry corresponding to that acknowledgment to the journal. Journal entries that are between a given pair of markers corresponding to the start of new replication periods identify modifications that will be replicated from the intermediate site to the remote site in the same replication period. Each time a new marker is added, the primary site can update the journal to indicate that the journal entries that are older than oldest marker (or the journal entries that are in between the oldest pair of markers) are no longer outstanding. For example, the primary site can remove those journal entries (as well as the oldest marker(s)) in response to adding a new marker.

In some embodiments, there are two types of markers used when periodic replication is performed between the intermediate and remote sites. The first type of marker identifies the start of a new replication period (and thus the end of the prior replication period). These markers are inserted into the journal in response to messages sent from the intermediate site to identify the start of new replication periods. For example, a marker can identify that a new replication period began at $T_N$. The second type of marker identifies one of the first types of markers (e.g., the second type of marker can indicate that all modifications that occurred prior to $T_N$ have been applied to the remote site). This second type of marker can be inserted into the journal in response to an acknowledgment from the intermediate site, which in turn identifies that all modifications that occurred in a particular replication period (e.g., the replication period ending at $T_N$) have been applied to the remote site.

If the primary site detects that the intermediate site has become inaccessible (e.g., due to maintenance, site failures, network failures, and the like) at 450, the primary site uses the journal to synchronize the replica at the remote site with the information being replicated from the primary site. The primary site does this by applying the outstanding modifications identified in the journal to the replica at the remote site, as indicated at 460.

Figure 5:
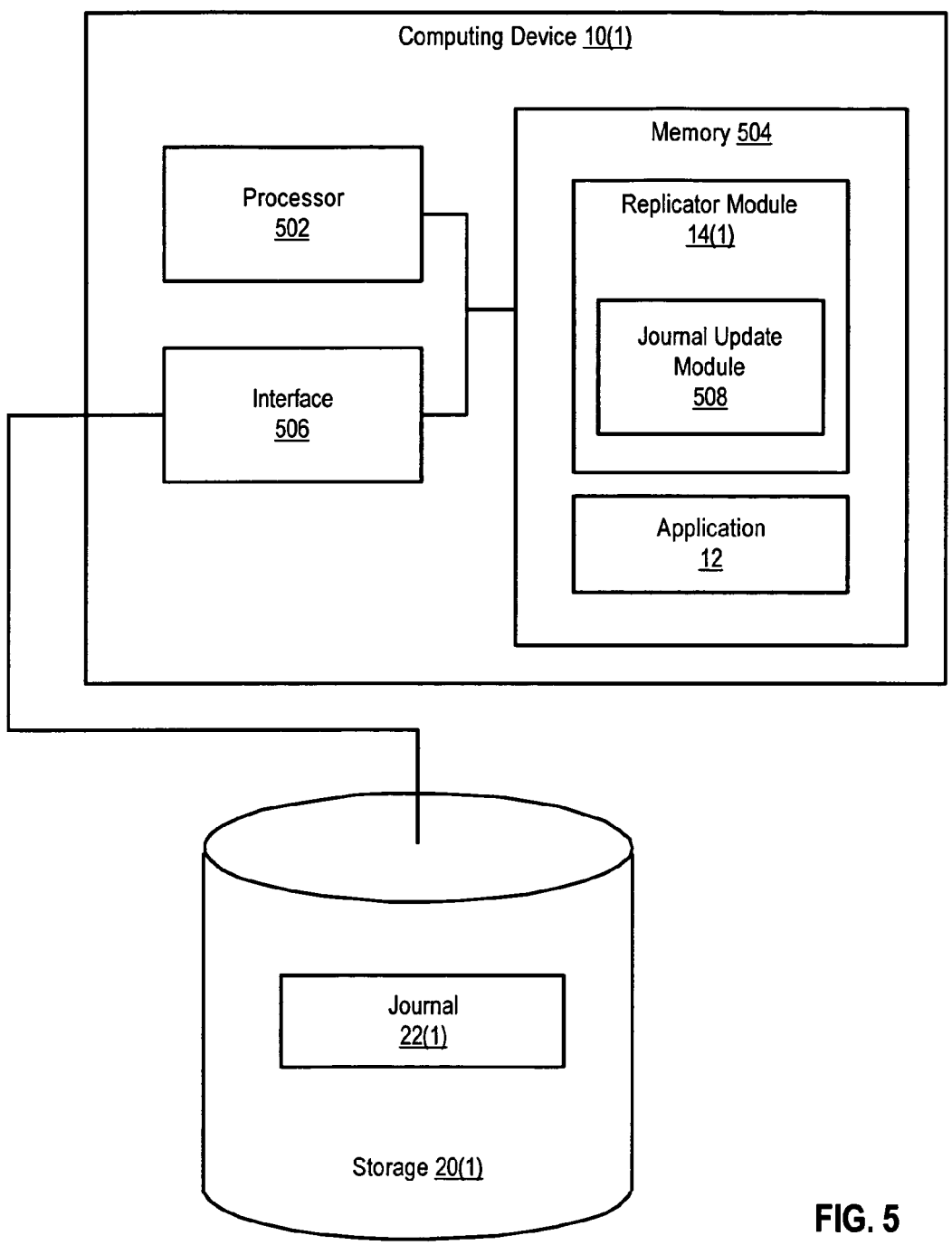
FIG. 5 is a block diagram of a computing system that implements a replicator module, according to one embodiment of the present invention.

FIG. 5 illustrates a block diagram of a computing device 10(1) (e.g., as shown in FIG. 1). As illustrated, computing device 10(1) includes one or more processors 502 (e.g., microprocessors, PLDs (Programmable Logic Devices), or ASICs (Application Specific Integrated Circuits)) configured to execute program instructions stored in memory 504. Memory 504 can include various types of RAM (Random Access Memory), ROM (Read Only Memory), Flash memory, MEMS (Micro Electro-Mechanical Systems) memory, and the like. Computing device 10(1) also includes one or more interfaces 506. Processor 502, interface 506, and memory 504 are coupled to send and receive data and control signals by a bus or other interconnect.

Interface 506 can include a network interface to various networks and/or interfaces to various peripheral buses. Interface 506 can include an interface to one or more storage devices, such as those that provide storage 20(1). Interface 506 can also include an interface to a network, for use in communicating with other replication sites and/or for use in communicating with networked storage devices.

In this example, program instructions executable to implement an instance of a replicator module 14(1) are stored in memory 504. Replicator module 14(1) includes a journal update module 508, which can detect reception of acknowledgments from an intermediate site and responsively update journal 22(1). Journal update module 508 can also update journal 22(1) in response to detecting modifications to a local copy of application data. Journal update module 508 can initiate and/or perform operations such as those illustrated at 410, 430, 440, 450, and 460 of FIG. 4.

The program instructions and data implementing the replicator module can be stored on various computer readable storage media such as memory 504. In some embodiments, such software is stored on a computer readable storage medium such as a CD (Compact Disc), DVD (Digital Versatile Disc), hard disk, optical disk, tape device, floppy disk, and the like). In order to be executed by processor 502, the instructions and data implementing the replicator module are loaded into memory 504 from the other computer readable storage medium. The instructions and/or data implementing the replicator module can also be transferred to computing device 10(1) for storage in memory 504 via a network such as the Internet or upon a carrier medium. In some embodiments, a computer readable medium is a carrier medium such as a network and/or a wireless link upon which signals such as electrical, electromagnetic, or digital signals, on which the data and instructions implementing a replicator module are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer implemented method comprising:
   detecting a change at a primary replication site, wherein the primary replication site comprises a storage device;
   updating a journal in response to detecting the change at the primary replication site, wherein the journal is stored in the storage device, and wherein the updating the journal in response to the detecting causes the journal to indicate that the change is currently being replicated;
   replicating the change to an intermediate replication site, wherein the replicating is performed by the primary replication site;

receiving an acknowledgment at the primary replication site from the intermediate replication site, wherein
the acknowledgment identifies whether the change has been successfully replicated from the intermediate replication site to a remote replication site, wherein replication of the change comprises application of the change to the remote site; and
updating the journal, in response to the acknowledgment, wherein the updating the journal in response to the acknowledgement causes the journal to indicate that the change is no longer being replicated.

2. The computer implemented method of claim 1, wherein:
the updating the journal in response to the acknowledgement comprises updating a pointer;
the pointer points to a position within the journal;
the acknowledgment comprises information identifying a location of a second pointer;
the second pointer points to a position within a second journal located at the intermediate replication site; and
after the journal is updated, the pointer points to an entry that corresponds to the entry identified by the second pointer.

3. The computer implemented method of claim 2, further comprising:
detecting that the intermediate replication site is inaccessible; and
synchronizing a copy of application data at the remote replication site, wherein
the synchronizing comprises applying each change identified in the journal to the copy of the application data at the remote replication site.

4. The computer implemented method of claim 1, wherein:
the updating the journal in response to the acknowledgement comprises inserting a marker into an entry in the journal;
the acknowledgement identifies that modifications that occurred in a prior replication period have been applied to the remote site; and
periodic replication is performed between the intermediate replication site and the remote replication site.

5. The computer implemented method of claim 4, further comprising:
detecting that the intermediate replication site is inaccessible; and
synchronizing a copy of application data at the remote replication site, wherein
the synchronizing comprises applying each change identified in the journal, subsequent to a second marker corresponding to the end of the prior replication period, to the copy of the application data at the remote replication site.

6. A non-transitory computer readable storage medium comprising program instructions executable to:
detect a change at a primary replication site, wherein the primary replication site comprises a storage device;
update a journal in response to detecting the change at the primary replication site, wherein the journal is stored in the storage device, and wherein the updating the journal in response to the detecting causes the journal to indicate that the change is currently being replicated;
replicate the change to an intermediate replication site, wherein the replicating is performed by the primary replication site;
detect an acknowledgment received at the primary replication site from the intermediate replication site, wherein the acknowledgment identifies whether the change has been successfully replicated from the intermediate replication site to a remote replication site, wherein replication of the change comprises application of the change to the remote site; and
update the journal, in response to the acknowledgment, wherein
the updating the journal in response to the acknowledgement causes the journal to indicate that the change is no longer being replicated.

7. The non-transitory computer readable storage medium of claim 6, wherein:
updating the journal in response to the acknowledgement comprises updating a pointer;
the pointer points to a position within the journal;
the acknowledgment comprises information identifying a location of a second pointer;
the second pointer points to a position within a second journal located at the intermediate replication site; and
after the journal is updated, the pointer points to an entry that corresponds to the entry identified by the second pointer.

8. The non-transitory computer readable medium storage of claim 7, wherein the program instructions are further executable to:
detect that the intermediate replication site is inaccessible; and
synchronize a copy of application data at the remote replication site, wherein
synchronizing the copy comprises applying each change identified in the journal to the copy of the application data at the remote replication site.

9. The non-transitory computer readable storage medium of claim 6, wherein:
updating the journal in response to the acknowledgement comprises inserting a marker into an entry in the journal;
the acknowledgement identifies that modifications that occurred in a prior replication period have been applied to the remote site; and
periodic replication is performed between the intermediate replication site and the remote replication site.

10. The non-transitory computer readable storage medium of claim 9, wherein the program instructions are further executable to:
detect that the intermediate replication site is inaccessible; and
synchronize a copy of application data at the remote replication site, wherein
synchronizing the copy comprises applying each change identified in the journal, subsequent to a second marker corresponding to the end of the prior replication period, to the copy of the application data at the remote replication site.

11. A system comprising:
a processor; and
a memory coupled to the processor, wherein the memory stores program instructions executable by the processor to:
detect a change at a primary replication site, wherein the primary replication site comprises a storage device;
update a journal in response to detecting the change at the primary replication site, wherein the journal is stored in the storage device, and wherein the updating the journal in response to the detecting causes the journal to indicate that the change is currently being replicated;
replicate the change to an intermediate replication site, wherein the replicating is performed by the primary replication site;

detect an acknowledgment received at the primary replication site from the intermediate replication site, wherein
the acknowledgment identifies whether the change has been successfully replicated from the intermediate replication site to a remote replication site, wherein replication of the change comprises application of the change to the remote site; and
update the journal, in response to the acknowledgment, wherein
the updating the journal in response to the acknowledgement causes the journal to indicate that the change is no longer being replicated.

12. The system of claim 11, wherein:
updating the journal in response to the acknowledgement comprises updating a pointer;
the pointer points to a position within the journal;
the acknowledgment comprises information identifying a location of a second pointer;
the second pointer points to a position within a second journal located at the intermediate replication site; and
after the journal is updated, the pointer points to an entry that corresponds to the entry identified by the second pointer.

13. The system of claim 11, wherein:
updating the journal in response to the acknowledgement comprises inserting a marker into an entry in the journal,
the acknowledgement identifies that modifications that occurred in a prior replication period have been applied to the remote site, and
periodic replication is performed between the intermediate replication site and the remote replication site.

14. The system of claim 11, further comprising:
detecting that the intermediate replication site is inaccessible; and
synchronizing a copy of application data at the remote replication site, wherein
synchronizing the copy comprises applying one or more changes identified in the journal to the copy of the application data at the remote replication site.

15. A system comprising:
means for detecting a change at a primary replication site, wherein the primary replication site comprises a storage device;
means for updating a journal in response to detecting the change at the primary replication site, wherein the journal is stored in the storage device, and wherein the updating the journal in response to the detecting causes the journal to indicate that the change is currently being replicated;
means for causing the primary replication site to replicate the change to an intermediate replication site;
means for receiving an acknowledgment at the primary replication site from the intermediate replication site, wherein
the acknowledgment identifies whether the change has been successfully replicated from the intermediate replication site to a remote replication site, wherein replication of the change comprises application of the change to the remote site; and
means for updating the journal, in response to the acknowledgment, wherein
the updating the journal in response to the acknowledgement causes the journal to indicate that the change is no longer being replicated.

16. The system of claim 15, wherein:
updating the journal in response to the acknowledgement comprises updating a pointer;
the pointer points to a position within the journal;
the acknowledgment comprises information identifying a location of a second pointer;
the second pointer points to a position within a second journal located at the intermediate replication site; and
after the journal is updated, the pointer points to an entry that corresponds to the entry identified by the second pointer.

17. The system of claim 15, wherein:
updating the journal in response to the acknowledgement comprises inserting a marker into an entry in the journal;
the acknowledgement identifies that modifications that occurred in a prior replication period have been applied to the remote site; and
periodic replication is performed between the intermediate replication site and the remote replication site.

18. The system of claim 15, further comprising:
means for detecting that the intermediate replication site is inaccessible; and
means for synchronizing a copy of application data at the remote replication site, wherein
synchronizing the copy comprises applying one or more changes identified in the journal to the copy of the application data at the remote replication site.

* * * * *